Figure 1:
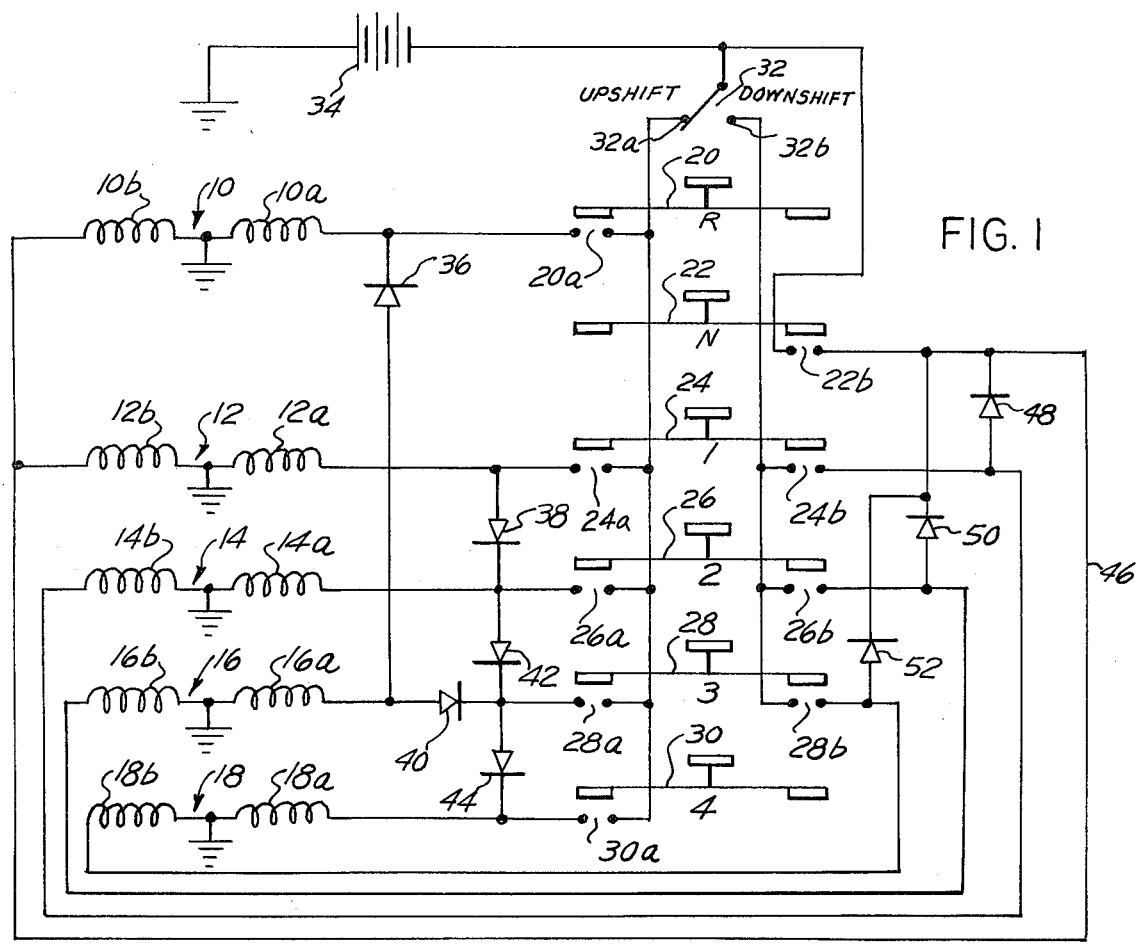

United States Patent [19]
Donovan

[11] 3,983,405
[45] Sept. 28, 1976

[54] SHIFT CONTROL SYSTEM FOR MULTI-STAGE TRANSMISSION

[76] Inventor: John S. Donovan, 16503 Santa Rosa, Detroit, Mich. 48221

[22] Filed: Dec. 19, 1974

[21] Appl. No.: 534,287

[52] U.S. Cl. .............................. 307/10 R; 74/365
[51] Int. Cl.² ........................................ H01H 47/00
[58] Field of Search ......... 307/10 R; 74/866, 473 R, 74/483 PB, 365

[56] References Cited
UNITED STATES PATENTS 3,652,901   3/1972   Wakamatsu et al. ................ 74/866

Primary Examiner—Robert K. Schaffer
Assistant Examiner—Morris Ginsburg
Attorney, Agent, or Firm—Krass & Young

[57] ABSTRACT

A shift control system is disclosed for use with a multi-stage transmission adapted to be disposed in a plurality of states in which various serial combinations of gears are disposed between an input and an output shaft. Two position solenoid valves are provided to control the engagement of each stage. A manually energized state selector for the transmission may take the form of either a shiftable lever or a plurality of push buttons, only one of which may be engaged at a single time. Pairs of single pole switches are associated with each state of the selector switch and are wired into two sets. Power is applied to one set or the other depending upon the position of a shift direction switch. Circuitry connects each solenoid valve to at least one switch in the upshift set and one in the downshift set. The higher shift ratios may be selectively deenergized to prevent the transmissionn from being accidently disposed in an excessively high shift ratio. A tachometer controlled comparator inhibits the deenergization of a high ratio transmission stage until the engine speed is low enough to prevent racing.

6 Claims, 3 Drawing Figures

SHIFT CONTROL SYSTEM FOR MULTI-STAGE TRANSMISSION

FIELD OF THE INVENTION

This invention relates to manually actuated shift control systems for multi-stage transmissions.

BACKGROUND OF THE INVENTION

1. Prior Art

Multi-stage transmissions of the type used for automobiles, trucks and the like may broadly be divided into two classes. In one class, which will be termed the parallel type, each stage is connectable between the input and output and only a single stage may be engaged at one time. Accordingly, when the transmission is shifted one stage must be disengaged and another stage engaged in synchronism. In the second class, which will be termed serial transmissions, the output of one stage is fed to the input of the next stage and each stage may be either engaged or disengaged so as to multiply its input power by either a first or second gear ratio. Typically, one of the gear ratios is unity.

In this serial class of transmissions, a shift simply involves the engagement of an additional higher stage or the disengagement of a previously engaged stage. In such transmissions, it is necessary to insure that when a particular stage is engaged, all lower stages are also engaged. This requirement is easily met employing shift levers which must be moved through definite sequences, so that, for example, the shift from neutral to third involves the sequential engagement of the first, second and then third stages. When a push button type electromechanical shift system is provided wherein the higher stage may be selected without previously engaging lower stages, means must be provided for insuring the proper set of engagements for each position of the actuator.

SUMMARY OF THE INVENTION

The present invention relates to a shift control system for a serial, multi-stage transmission including means for insuring the proper engagement of all stages of the transmission for any position of the shift control. The shift control may take the form of either push buttons which are individually selectable, or a shift lever which may be moved to any one of a plurality of positions.

The present invention provides a two-position solenoid energized actuator for each stage of the transmission. The actuators are preferably of the double solenoid, non-spring return type so that energization of one of the solenoids moves the actuator into a first position, and it remains in that position until the second solenoid is energized, when the actuator is moved to its second position.

In addition to the manually engageable transmission stage selector, the system of the present invention incorporates a two-position switch controlling the direction of shifts. When the switch is in the up-shift position, shifts in the upward direction may be achieved, but movements of the stage control selector to a down-shift position will not modify the state of the transmission. Similarly, when the shift direction control is in a down-shift direction, changes of the stage selector to a higher stage will not modify the condition of the transmission. This switch thus prevents accidental shifts in the wrong direction. It may also be connected to and operate in unison with the throttle control.

To prevent racing of the engine which could be harmful, a tachometer mechanism conditions the down-shifting of the transmission as a function of the engine speed. For example, a shift from fourth stage to third stage may be only allowed when the engine speed is below 3,000 rpm while a shift from third stage to second stage may be achieved as long as the engine speed is below 2,500 rpm. When a down-shift is attempted and the engine speed is too high to allow that down-shift, the control system permits the down-shift as soon as the engine speed drops below the control figure.

The preferred embodiment of the invention also includes a switch mechanism for controlling the maximum upper range of the transmission. For example, in a five stage transmission, switches are provided which will permanently disengage either the fifth, or the fifth and the fourth stages, effectively converting the transmission to either a four or three stage transmission. This is particularly useful in truck transmissions having a high number of ratios, which do not always require all the torque multiplication available.

In the preferred embodiment of the invention one or two of single pole single throw switches are associated with each stage selector position. The switches associated with the stage are closed when that stage is selected. On those stages having a pair of switches one of the switches has one terminal connected to the battery when the shift direction switch is in the up-shift position and the other switch is energized when the shift direction switch is in the down-shift direction. Accordingly, when the stage selection control is in a particular stage, one of the two single pole switches associated with that stage is energized, depending upon the state of the shift direction control switch. Diode circuitry connected to various of the shift engagement solenoids and the shift direction selector switches, engages the proper solenoids for each combination of stage selection switch and shift direction switch.

The shift control system of the present invention therefore allows the use of convenient push button switches or selector lever switches without creating the danger of accidentally shifting the transmission to an improper position which might damage the engine or the transmission.

Figure 3:
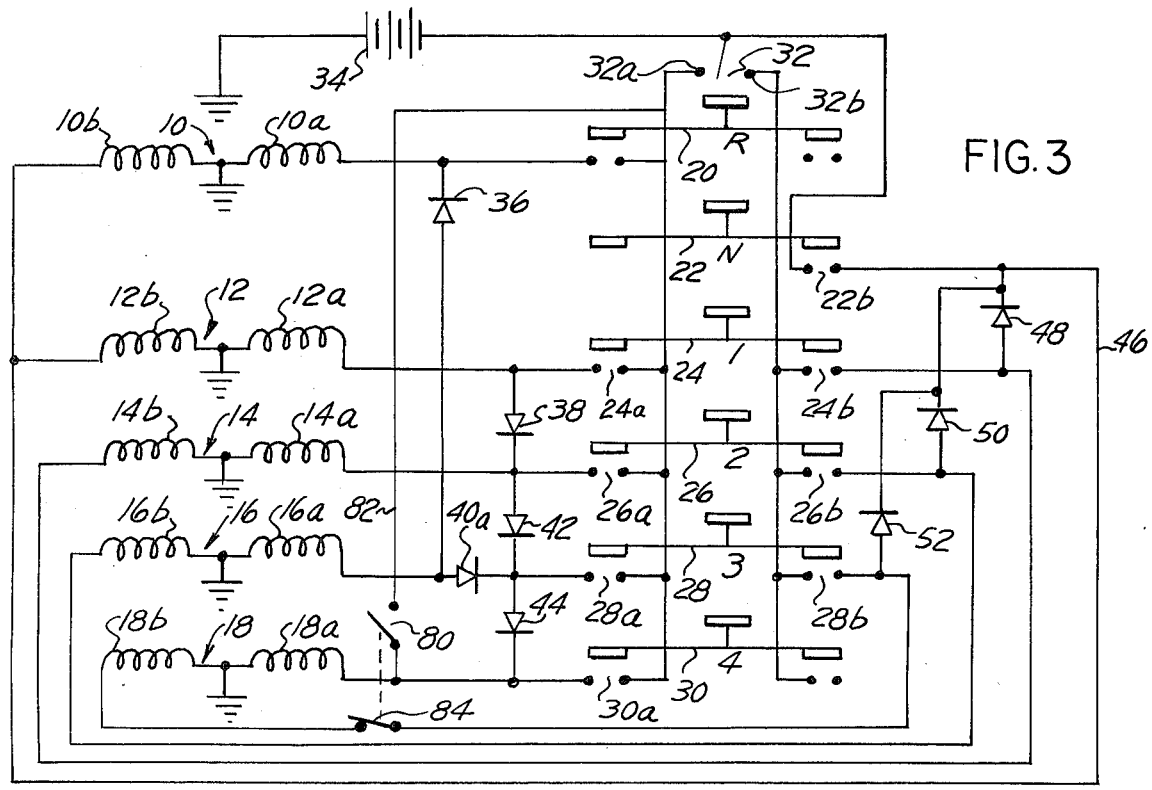
Figure 2:
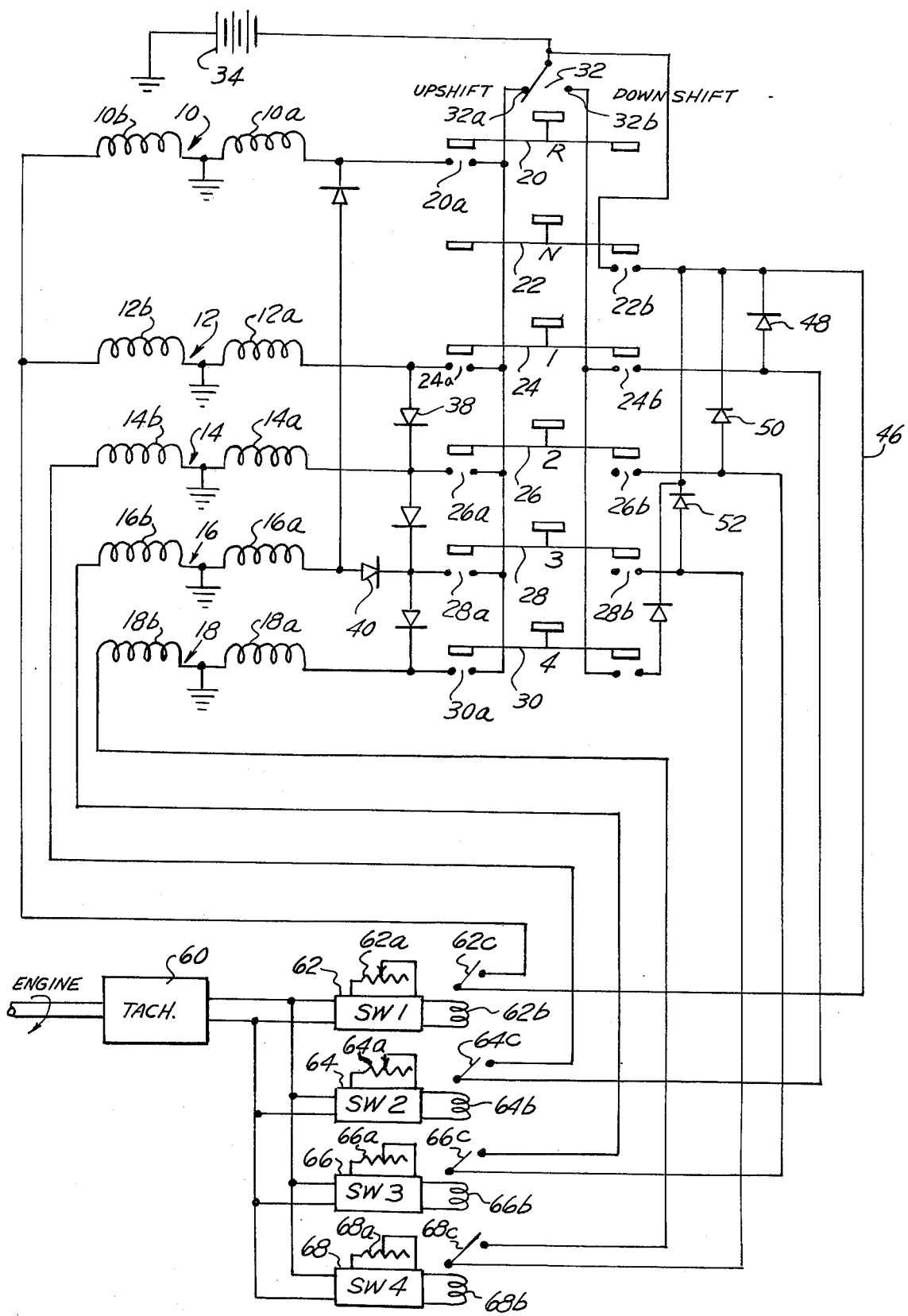

Other objectives, advantages and applications of the present invention will be made apparent by the following detailed description of several embodiments of the invention. The description makes reference to the accompanying drawings in which:

FIG. 1 is a schematic diagram of a control system formed in accordance with the present invention incorporating a shift direction switch to condition the operation of a push button stage selector;

FIG. 2 is a schematic diagram of a second embodiment of the invention wherein down-shifts of the transmission, selected by the stage selector, are inhibited when the engine speed is excessive for a particular down-shift; and FIG. 3 is a schematic diagram of a third embodiment of the invention incorporating switch means for selectively enabling or disenabling the transmission stage associated with the highest shift range.

All three embodiments of the invention disclosed in the drawings are intended to be employed with a serial type transmission having one reverse stage and four stages of forward engagement. In each of the embodiments the reverse stage is controlled by a two solenoid shift acutator 10, having a pair of solenoids 10a and 10b. Energizing the solenoid 10a engages the stage and when the solenoid 10b is energized the reverse stage is disengaged. The circuitry is such that solenoids 10a and 10b cannot be energized simultaneously.

Similarly, the first forward stage of the transmission is controlled by an engager generally indicated at 12 having a pair of solenoids 12a and 12b which respectively engage and disengage that stage. A pair of solenoids 14a and 14b are associated with a second forward stage actuator generally indicated at 14. The third stage actuator 16 has a pair of solenoids 16a and 16b and the fourth forward stage actuator 18 has an engaging solenoid 18a and a disengaging solenoid 18b. There is no limit to the number of stages with which the invention may be employed.

The control is provided with a six push button stage selector switch. The push buttons may be of the type wherein a button once pushed stays depressed until another button is pushed, at which time the first button rises. Alternatively, the push buttons could be of the momentary contact type which rise as soon as the depressing force is removed.

The push button 20 is adapted to engage the transmission into reverse; the push button 22 engages the transmission into neutral; the push button 24 engages the transmission into first forward gear; the push button 26 engages the transmission into second forward gear; the push button 28 engages the transmission into third forward gear; and the push button 30 engages the transmission into the fourth forward gear.

Each push button is physically associated with either one or two switches each having sets of single pole single throw, normally open, contacts. The single pair of contacts associated with the reverse switch 20 are denominated 20a; the single pair of contacts associated with the neutral switch 22 are denominated 22b; the two sets of contacts associated with the first forward stage 24 are denominated 24a and 24b; the two sets of contacts associated with the second forward stage 26 are denominated 26a and 26b; the two sets of contacts associated with the third forward stage 28 are denominated 28a and 28b; and the single pair of contacts associated with the fourth forward stage switch 30 are denominated 30a.

A single pole double throw switch 32 can bring its common contact into connection with either one pole 32a or a second pole 32b. The switch 32 is the shift direction control selector and when the switch makes contact with the terminal 32a, upshifts are enabled while when the switch makes contact with terminal 32b, down-shifts are enabled. The common terminal is connected to the negative terminal of the vehicle battery 34 which has its positive terminal grounded. Accordingly, the switch 32 controls the application of negative potential to either the terminal 32a or 32b.

The terminal 32a is connected to one contact of each of the contact sets 20a, 24a, 26a, 28a and 30a and similarly the contact 32b of the shift direction control switch is connected to one contact of each of the contact sets, 24b, 26b and 28b. When the switch 32 is in its up-shift position wherein it contacts the terminal 32a, the a contact sets associated with each of the push buttons receive power and the b contact sets do not receive any power. When the switch 32 is thrown to the down-shift position, this relationship is reversed. The one exception to this rule is the contact 22b associated with the neutral push button 22, which is permanently connected to the negative terminal of the battery 34, independent of the position of the switch 32.

The other contact of contact set 28a is connected to the reverse stage engaging solenoid 10a through a diode 36 which allows only unidirectional current flow between the elements in accordance with the orientation of the diode. The other terminal of that solenoid, like one of the terminals of each of the solenoids, is grounded. Accordingly, when the switch 32 is in its up-shift position and the push button 20 is depressed, the solenoid 10a is energized, shifting the reverse stage of the solenoid to the engaged position. The contact set 28a is also connected to the third forward stage engaging solenoid 16a through a diode 40, or a similar unidirectional conductive device. The engagement of the third forward stage at the same time as the reverse stage provides the appropriate reverse gear ratio. The diode 36 prevents energization of the reverse solenoid 10a when the third forward stage solenoid 16a is energized to put the transmission into third gear.

In a similar fashion, the free member of the contact set 24a is connected to the first stage engaging solenoid 12a which has its other terminal grounded, so as to engage the first stage of the transmission when the shift direction selector is in the up-shift direction and the push button 24 is depressed; and the engaging solenoid 12a for the first forward stage is connected to the contact set 24a so that a current is applied to the solenoid 12a when the push button 24 is depressed. The engaging solenoid 14a for the second forward stage is connected to the contact set 26a so as to engage the second forward stage when the push button 26 is depressed and shift direction switch 32 is in an up-shift direction. The contact set 26a is also connected to the solenoid 12a through a diode 38 so that both the first and second forward stages are placed in the engaged position when the push button 26 is depressed. The directional quality of the diode 38 prevents the closing of the contact set 24a from energizing the solenoid 14a.

The contact set 28a associated with the third stage push button 28 is connected to the third stage solenoid 16a through a diode 40 which prevents current applied to the solenoid 16a through the diode 36 from propagating to the other solenoids. The contact 28a is also connected to the solenoids 14a and 12a through the diodes 42 and 38. The contact 30a is connected to the solenoid 18a in the fourth stage so as to engage the fourth stage when the push button 30 is depressed and a diode 44 applies the same power to the first three stages so that all four are engaged when the push button 30 is depressed and the shift direction switch 32 is in the up-shift direction.

Considering the b contact sets, as has been noted the contact set 22b associated with a neutral push button 22 has one terminal permanently connected to the negative terminal of battery 34. The other contact of that set connects directly to the disengage solenoids for the reverse stage and the first forward stage, 10b and 12b respectively, through a conductor 46. It also connects to the disengage solenoids 14b of the second stage through a diode 48; to the disengage solenoid 16b for the third forward stage through a diode 50; and to the disengage solenoid 18b for the fourth forward stage through a diode 52. Thus, when the neutral push button 22 is engaged, independent of the setting of the shift direction control lever 32, all of the transmission stages are disengaged.

The contact set 24b is connected to the down-shift contact 32b of the shift direction selection switch and the other contact is connected to the second forward stage disengage solenoid 14b. Accordingly, when the shift direction control is in the down-shift direction and the push button 24 is depressed, the second forward stage is disengaged, if it was previously engaged. Similarly, the contact sets 26b and 28b are connected to the down-shift side of the shift direction selection switch 32 and to the disengage solenoids for the third and fourth stages, 16b and 18b, respectively.

In operation, this arrangement prevents a shift in any direction contrary to the position of the shift direction selection switch 32 with exception of a shift into neutral, which is necessary for emergency purposes. When the shift direction control is in the up-shift direction, the depression of a button which would cause a down-shift produces no change in state of the transmission and similarly when the shift selection switch is in the down-shift direction, an attempt to up-shift the transmission is ineffective. When a push button is depressed to cause a shift in the same direction as the position of the shift direction control switch, all of the transmission stages which should be controlled by that switch are properly engaged or disengaged, independently of whether the shift is in an increment of one or more stages.

The embodiment of FIG. 2 includes all of the elements of FIG. 1 and additionally adds mechanism and circuitry for delaying a down-shift signal by the depression of one of the lower stage push buttons if the engine speed at the time of that depression is so high that the engine would undesirably race if the down-shift were made.

All of the elements of FIG. 2 which are identical to those of the embodiment of FIG. 1 have been given the same numerals. The additional circuitry is interposed in the lines connecting the down-shift contacts 22b, 24b, 26b and 28b with their respective down-shift solenoids. The down-shift limiting circuitry is controlled by a tachometer 60, appropriately connected to the vehicle engine. The tachometer may be of any type which generates an electrical signal proportional to the engine speed. Its output is provided to four comparators 62, 64, 66 and 68. Each of the comparators includes a potentiometer 62a, 64a, 66a and 68a which may be adjusted to control the reference voltage of the comparator.

The comparators act to determine when the output of the tachometer is less than the reference voltage set up by their potentiometer and to energize an output solenoid 62b, 64b, 66b and 68b only at such time as the tachometer output is less than the reference voltage. Single pole switches are associated with each solenoid. The switch set 62c is interposed in the line between the contact set 22b and the disengage solenoids 10b and 12b for reverse and the first forward stage respectively. Contact set 64c is interposed in the line between the contact set 24b and the second forward stage disengage solenoid 14b. Contact set 66c is interposed between the contact sets 26b and the third forward stage disengage solenoid 16b; and the contact set 68c is interposed between the contact set 24b and the fourth forward stage disengage solenoid 18b.

The comparators operate only when the direction selection switch 32 is in the downward direction and a down-shift is attempted by depressing push buttons 28, 26 or 24. If the engine speed as indicated by the output of the tachometer 60 exceeds the safe down-shift speed for that stage as determined by the potentiometer associated with that stage, the associated disengage solenoid will not be energized until the engine speed falls below the maximum level. In this manner the engine is prevented from racing by an untimely down-shift.

The potentiometers 62a, 64a, 66a and 68a will be manually adjusted to allow down-shifts to neutral, first, second and third, respectively, at increasing speeds. For example, the down-shift to neutral might be allowed to occur at speeds below 500 rpm; the down-shift to first might be allowed at speeds below 2,000 rpm; the down-shift to second at speeds below 2,750 rpm; and the down-shift to third at speeds below 3,000 rpm.

FIG. 3 illustrates a variation on the shift control system wherein means are provided to disable one or more of the highest forward speed ranges so as to reduce the overall torque multiplication. The apparatus illustrated is substantially that of FIG. 1 with a pair of ganged single pole switches interposed in the connections to the solenoids 18a and 18b of the fourth forward speed, which may be used to selectively disengage that stage by permanently placing it in a direct drive condition. A normally open switch element 80 is interposed in a line 82 extending between the up-shift terminal 32a of the shift direction selection switch and the ungrounded side of the solenoid 18a. A normally closed switch element 84 is interposed in the connection between the ungrounded side of the fourth stage solenoid 18b and the down-shift contacts 28b. The switch elements 80 and 84 are ganged together.

When the fourth stage of the transmission is to be de-energized, the switches are thrown so as to close switch 80 and open switch 84. This supplies power to solenoid 18a whenever the switch direction control is in the up-shift direction. Solenoid 18a engages the fourth stage into a direct drive. Simultaneously, ganged switch 84 is opened preventing the engagement of solenoid 18b. In this manner, the fourth stage is always shifted to a direct drive position independent of the position of the shift stage control.

Having thus described my invention, I claim: the embodiments of the invention in which an exclusive property or privilege is claimed are defined as follows:

1. In a transmission having a plurality of stages adapted to be engaged in a serial manner, a shift control system comprising: a plurality of electrically energized two-position actuators, one associated with each transmission stage, each adapted to place its associated stage in either an engaged or non-engaged position; a manually controlled state selector having a plurality of positions equal to at least the number of stages in the transmission; a source of electrical power; a plurality of switches having their conditions controlled by the state selector; a shift direction control switch and electrical conductor means interconnecting said source of electric power, said switches, said shift direction control switch, and said two-position actuators so as to control the engagement and disengagement of the stages of the transmission as a function of the position of the state selector.

2. The transmission of claim 1 wherein said switches include a plurality of single throw down-shift switches associated with certain positions of the state selector and a plurality of single throw up-shift switches associated with certain positions of the state selector, the switches having a first condition when the state selector is in a state associated with such switch and a second condition when the state selector is in a different position.

3. The transmission of claim 2 wherein said electrical conductor means, includes uni-directional conductive devices.

4. The transmission of claim 1 including switch means for de-engerizing one or more of the highest ratio stages of the transmission so as to prevent the engagement of those stages by the state selector.

5. The transmission of claim 1 wherein the transmission has an input shaft driven by the engine, and further including a tachometer operative to generate a signal proportional to the speed of the engine; and a plurality of means connected to the output of the tachometer and operative to condition the energization of certain of the actuators following a change in the position of the state selector, as a function of said signal of the tachometer.

6. In a transmission having a plurality of stages adapted to be engaged in a serial manner, a shift control system comprising: a plurality of electrically energized two-position actuators, one associated with each transmission stage, each adapted to place its associated stage in either a first or second position; a manually controlled state selector having a plurality of positions equal to the number of stages in the transmission; a plurality of single throw down-shift switches associated with certain of the positions of the state selector; a plurality of single throw up-shift switches associated with certain positions of the state selector; connections between each of the actuators, and at least one of either the up-shift or down-shift switches; a source of electrical power; and a shift direction control switch adapted to provide power to either one terminal of each of the up-shift switches or one terminal of each of the down-shift switches so as to operate in accordance with the position of the state selector; connections between the source of electric power, switches, and the two-position actuators, adapted to energize certain of the actuators as a function of the position of the state selector; means for generating an electrical signal proportional to the input speed of the transmission; and means controlled by said electrical signal proportional to the speed of the input for conditioning the engagement of certain of the two-position actuators following a change in the position of the state selector.

* * * * *